US009398253B2

United States Patent
Lee et al.

(10) Patent No.: US 9,398,253 B2
(45) Date of Patent: Jul. 19, 2016

(54) VIDEO PAUSE INDICATION IN VIDEO TELEPHONY

(71) Applicant: QUALCOMM Incorporated, San Diego, CA (US)

(72) Inventors: Tien-Hsin Lee, San Diego, CA (US); Min Wang, San Diego, CA (US); Radhika Agrawal, San Diego, CA (US); Vikram Singh, San Diego, CA (US); Nathan Allan Rickey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/257,300

(22) Filed: Apr. 21, 2014

(65) Prior Publication Data

US 2015/0029303 A1    Jan. 29, 2015

(30) Foreign Application Priority Data

Jul. 26, 2013    (IN) .......................... 2477/MUM/2013

(51) Int. Cl.
*H04N 7/14* (2006.01)
*H04L 29/06* (2006.01)

(52) U.S. Cl.
CPC ............ *H04N 7/147* (2013.01); *H04L 65/1083* (2013.01); *H04L 65/608* (2013.01); *H04L 65/80* (2013.01)

(58) Field of Classification Search
CPC .............................. H04L 65/608; H04N 7/147
USPC ........................................ 348/14.12; 370/260
See application file for complete search history.

(56) References Cited

U.S. PATENT DOCUMENTS

| | | | | |
|---|---|---|---|---|
| 6,570,880 | B1* | 5/2003 | Coden | 370/404 |
| 7,146,104 | B2* | 12/2006 | Farmer | 398/72 |
| 8,995,815 | B2* | 3/2015 | Maharajh | G06F 17/30035 386/205 |
| 2002/0004841 | A1* | 1/2002 | Sawatari | H04L 47/10 709/232 |
| 2002/0057333 | A1 | 5/2002 | Mayuzumi | |
| 2007/0011343 | A1* | 1/2007 | Davis et al. | 709/231 |
| 2009/0135735 | A1 | 5/2009 | Zhang et al. | |
| 2011/0087765 | A1 | 4/2011 | Musgrave et al. | |
| 2013/0141324 | A1 | 6/2013 | Zambrano et al. | |
| 2013/0159471 | A1* | 6/2013 | Saada et al. | 709/219 |
| 2013/0279606 | A1 | 10/2013 | Vanam et al. | |
| 2014/0253674 | A1* | 9/2014 | Grondal et al. | 348/14.08 |

FOREIGN PATENT DOCUMENTS

WO    2007091207 A1    8/2007

OTHER PUBLICATIONS

International Search Report and Written Opinion from International Application No. PCT/US2014/047655, dated Oct. 9, 2014, 8 pp.

(Continued)

*Primary Examiner* — Creighton Smith
(74) *Attorney, Agent, or Firm* — Shumaker & Sieffert, P.A.

(57) ABSTRACT

The disclosure relates to video telephony and, more particularly, to techniques for detecting a video pause in a video telephony application. In one example of the disclosure, a method for video telephony comprises detecting, at a receiving device, that video data packets associated with a video telephony call have stopped arriving from a sending device, and determining that the sending device has paused a video portion of the video telephony call based on information contained in video control packets.

22 Claims, 6 Drawing Sheets

(56) References Cited

OTHER PUBLICATIONS

Schulzrinne et al., "RTP: A Transport Protocol for Real-Time Applications," Network Working Group, Request for Comments 3550, dated Jul. 2003, 90 pp.

International Preliminary Report on Patentability—PCT/US2014/047655, The International Bureau of WIPO—Geneva, Switzerland, Oct. 2, 2015.

Schulzrinne et al., "RFC 3550 RTP: A Transport Protocol for Real-Time Applications," Network Working Group Request for Comments, Jul. 2003, 89 pp.

* cited by examiner

VIDEO PAUSE INDICATION IN VIDEO TELEPHONY

RELATED APPLICATIONS

This application claims the benefit of Indian Patent Application No. 2477/MUM/2013, filed Jul. 26, 2013, the entire content of which is incorporated by reference herein.

TECHNICAL FIELD

The disclosure relates to video telephony and, more particularly, to techniques for detecting a video pause in a video telephony application.

BACKGROUND

Communication devices, such as mobile phones, may include an audio capture device, such as a microphone or speech synthesizer, an audio encoder to generate audio packets (or frames), a video capture device, such as a camera, and a video encoder to generate video packets frames. The phone may use communication protocol layers, such as real-time transport protocol (RTP), radio link protocol (RLP), medium access control (MAC), and physical (PHY) layers. In a video telephony application, the communication device may place video and audio RTP packets in a RLP queue. A MAC layer module may generate MAC layer packets from contents of the RLP queue. The MAC layer packets may be converted to PHY layer packets for transmission across a communication channel to another communication device.

SUMMARY

The disclosure relates to video telephony and, more particularly, to techniques for detecting a video pause in a video telephony application In one example of the disclosure, a method for video telephony comprises detecting, at a receiving device, that video data packets associated with a video telephony call have stopped arriving from a sending device, and determining that the sending device has paused a video portion of the video telephony call based on information contained in video control packets.

In another example of the disclosure, an apparatus configured for video telephony comprises means for detecting, at a receiving device, that video data packets associated with a video telephony call have stopped arriving from a sending device, and means for determining that the sending device has paused a video portion of the video telephony call based on information contained in video control packets.

In another example of the disclosure, an apparatus configured for video telephony comprises a receiving device configured to detect, at the receiving device, that video data packets associated with a video telephony call have stopped arriving from a sending device, and determine that the sending device has paused a video portion of the video telephony call based on information contained in video control packets.

In another example, this disclosure describes a computer-readable storage medium storing instructions that, when executed, cause one or more processors of a device for video telephony to detect, at the receiving device, that video data packets associated with a video telephony call have stopped arriving from a sending device, and determine that the sending device has paused a video portion of the video telephony call based on information contained in video control packets.

The details of one or more embodiments are set forth in the accompanying drawings and the description below.

DETAILED DESCRIPTION

The disclosure relates to video telephony and, more particularly, to techniques for detecting a video pause in a video telephony application. Current techniques for indicating and detecting a pause in video during a video telephony call may cause an ambiguous state between the communication devices involved in the call. In some circumstances, after a video portion of a video telephony call, that has been previously paused, has been restarted, the current techniques for indicating a pause in video may cause one of the communication devices in the call to assume that a one-way video call (video only sent from one device) is still in effect, while the other communication device may assume that a two-way video call (video sent from both parties) has resumed. The techniques of this disclosure are directed to techniques for indicating and determining a pause in video that avoids such an ambiguous state.

Figure 1:
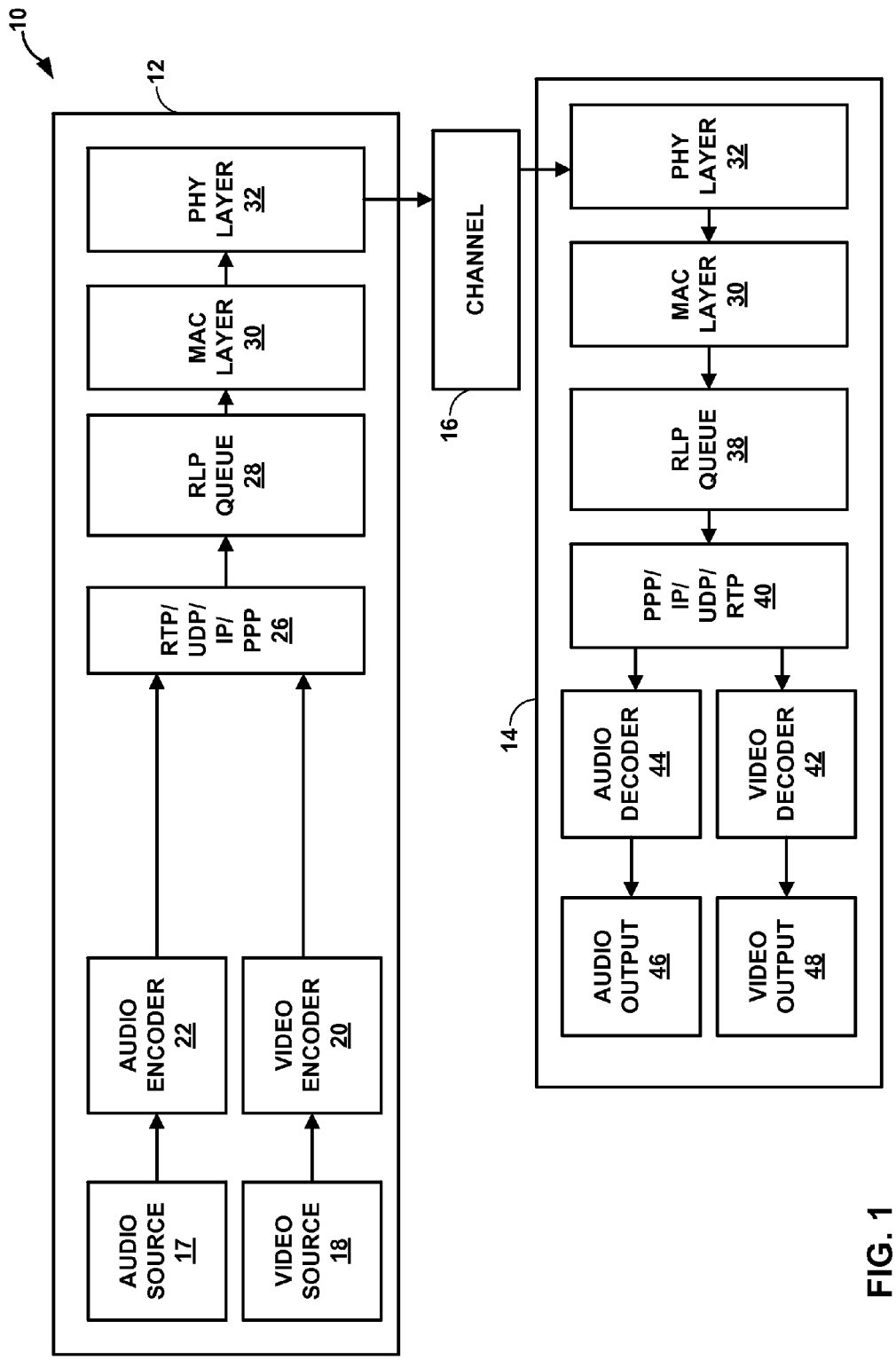
FIG. 1 illustrates a video and audio encoding and decoding system.

FIG. 1 illustrates a video encoding and decoding system 10 that may utilize the techniques of this disclosure. The system 10 includes an encoder system 12 sending data across a transmission channel 16 to a decoder system 14. The encoder system 12 may be in a first video communication device and may include an audio source 17, video source 18, video encoder 20, audio encoder 22, real-time transport protocol (RTP)/user datagram protocol (UDP)/Internet protocol (IP)/point-to-point protocol (PPP) conversion module 26, radio link protocol (RLP) queue 28, MAC layer module 30 and physical (PHY) layer module 32. Other embodiments of the encoder system 12 may include other elements instead of or in addition to the elements shown in FIG. 1. Other embodiments of the encoder system 12 may include fewer elements than those shown in FIG. 1.

The decoder system 14 may be in another video communication device and may include a PHY layer module 34, MAC layer module 36, RLP queue 38, RTP/UDP/IP/PPP conversion module 40, video decoder 42, audio decoder 44, audio output unit 46 and video output unit 48. Other embodiments of the decoder system 14 may include other elements instead of or in addition to the elements shown in FIG. 1. Other embodiments of the decoder system 14 may include fewer elements than those shown in FIG. 1.

System 10 may provide bi-directional video and audio transmission, e.g., for video telephony (VT) via transmission channel 16. Reciprocal encoding, decoding, and conversion modules may be provided on opposite ends of channel 16. In some embodiments, encoder system 12 and decoder system 14 may be embodied within video communication devices such as wireless mobile terminals equipped for video streaming, VT, or both. The mobile terminals may support VT according to packet-switched standards such as RTP, UDP, IP, or PPP.

RTP/UDP/IP/PPP conversion module 26 adds appropriate RTP/UDP/IP/PPP header data to audio and video data received from audio encoder 22 and video encoder 20, and places the data in RLP queue 28. RTP runs on top of UDP, while UDP runs on top of IP, and IP runs on top of PPP. MAC layer module 30 generates MAC RLP packets from the contents of RLP queue 28. PHY layer module 32 converts the MAC RLP packets into PHY layer packets for transmission over channel 16.

PHY layer module 34 and MAC layer module 36 of decoding system 14 operate in a reciprocal manner. PHY layer module 34 converts PHY layer packets received from channel 16 to MAC RLP packets. MAC layer module 36 places the MAC RLP packets into RLP queue 38. RTP/UDP/IP/PPP conversion module 40 strips the header information from the data in RLP queue 38, and reassembles the video and audio data for delivery to video decoder 42 and audio decoder 44, respectively.

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000, wideband CDMA (WCDMA) standards, 3G, 4G, LTE, or any other CDMA-based air interfaces. TDMA may be delivered according to the Global System for Mobile Communications (GSM) standard. The Universal Mobile Telecommunication System (UMTS) standard permits GSM or WCDMA operation. For VT applications, system 10 may be designed to support high data rate (HDR) technologies such as cdma2000 1x EV-DO, Release 0, Revision A or subsequent EV-DO releases.

The video source 18 may be a video capture device, such as one or more video cameras, one or more video archives, or a combination of video cameras and video archives. The video encoder 20 generates encoded video data according to a video compression method, such as MPEG-4, H.264/AVC (advanced video coding), or high efficiency video coding (HEVC). Other video compression methods may also be used, such as the International Telecommunication Union (ITU) H.263, VP9, MPEG-2, or other standardized or proprietary methods. Video encoder 20 may provide a video source rate control scheme that is generally CODEC-dependent. For example, video encoder 20 may be adapted for video encoding according to HEVC, MPEG4, ITU H.263, ITU H.264 or another standard or technique. In one example, video encoder 20 may be implemented by a DSP or embedded logic core.

The audio source 17 may be an audio capture device, such as a microphone, or a speech synthesizer device. The audio encoder 22 may encode audio data to accompany the video data. The audio data may be encoded according to an audio compression method, such as adaptive multi-rate narrow band (AMR-NB), or other techniques. For VT applications, the video will permit viewing of a party to a VT conference, and the audio will permit the speaking voice of that party to be heard.

In operation, RTP/UDP/IP/PPP conversion module 26 obtains video and audio data packets from video encoder 20 and audio encoder 22. RTP/UDP/IP/PPP conversion module 26 adds appropriate header information to the audio packets and inserts the resulting data within RLP queue 28. Likewise, RTP/UDP/IP/PPP conversion module 26 adds appropriate header information to the video packets and inserts the resulting data within RLP queue 28. MAC layer module 30 retrieves data from RLP queue 28 and forms MAC layer packets. Each MAC layer packet carries RTP/UDP/IP/PPP header information and audio or video packet data that is contained within RLP queue 28.

Audio packets may be inserted into RLP queue 28 independently of video packets. In some cases, a MAC layer packet generated from the contents of RLP queue 28 will carry only header information and video packet data. In other cases, the MAC layer packet will carry only header information and audio packet data.

In some cases, the MAC layer packet will carry header information, audio packet data and video packet data, depending on the contents of RLP queue 28. The MAC layer packets may be configured according to a radio link protocol (RLP), and may be referred to as MAC RLP packets. PHY layer module 32 converts the MAC RLP audio-video packets into PHY layer packets for transmission across channel 16.

Channel 16 carries the PHY layer packets to decoder system 14. For example, channel 16 may be a wired connection, such as a local or wide-area wired network. Alternatively, as described herein, channel 16 may be a wireless channel such as a cellular, satellite or optical channel.

Channel conditions may be a concern for wired and wireless channels, but are especially problematic for mobile VT applications performed over a wireless channel 16, in which channel conditions may suffer due to fading or congestion. For example, channel 16 may be characterized by a reverse link (RL) having a throughput that varies according to channel conditions. Throughput may be estimated based on channel conditions, as represented by one or more of current wireless channel transmit rate, wireless base station activity, and transmit power limitations. For example, the channel conditions may be determined based on current MAC layer data rate, a reverse activity bit (RAB), and a power amplifier (PA) limit.

Video encoder 20 may maintain a virtual video buffer representing an amount of the encoded video relative to a target encoding rate. The target encoding rate may be a maximum encoding rate specified for video packets transmitted over channel 16. Video encoder 20 may control an actual encoding rate of the video from video source 18.

PHY layer module 34 of decoder system 14 identifies the MAC layer packets from the PHY layer packets and reassembles the content into MAC RLP packets. MAC layer module 36 then reassembles the contents of the MAC RLP packets to provide video and audio packets for insertion within RLP queue 38. RTP/UDP/IP/PPP module 40 removes the accompanying header information and provides video packets to video decoder 42 and audio packets to audio decoder 44.

Video decoder 42 decodes the video data frames to produce a stream of video data for use in driving a display device. Audio decoder 44 decodes the audio data to produce audio information for presentation to a user, e.g., via an audio speaker.

Video telephony (VT) refers to real-time communication of packets carrying audio and video data between at least two devices, such as systems 12 and 14. A first VT device 12 includes a video encoder 20 that obtains video from a video capture device 18, such as a video camera or video archive, and generates video packets. Similarly, an audio encoder 22 in the VT device 12 obtains audio from an audio capture device 17, such as a microphone or speech synthesizer, and generates audio packets. The video packets and audio packets are placed in a RLP queue 28. A MAC layer module 30 generates MAC layer packets from the contents of the RLP queue 28. The MAC layer packets are converted to PHY layer packets for transmission across a communication channel 16 to a second VT device 14.

In mobile VT applications, a VT device (wireless terminal) receives PHY layer packets via a wireless forward link (FL) (i.e., "downlink") from a base station. A VT device transmits PHY layer packets via a wireless reverse link (RL) (i.e., "uplink") to a base station. Each VT device includes PHY and MAC layers to convert the received PHY and MAC layer packets and reassemble the packet payloads into audio packets and video packets. A video decoder 42 within the VT device decodes the video data for presentation to a user via a display device (video output) 48. An audio decoder 44 within the VT device decodes the audio data for output via an audio speaker (audio output) 46.

Figure 2:
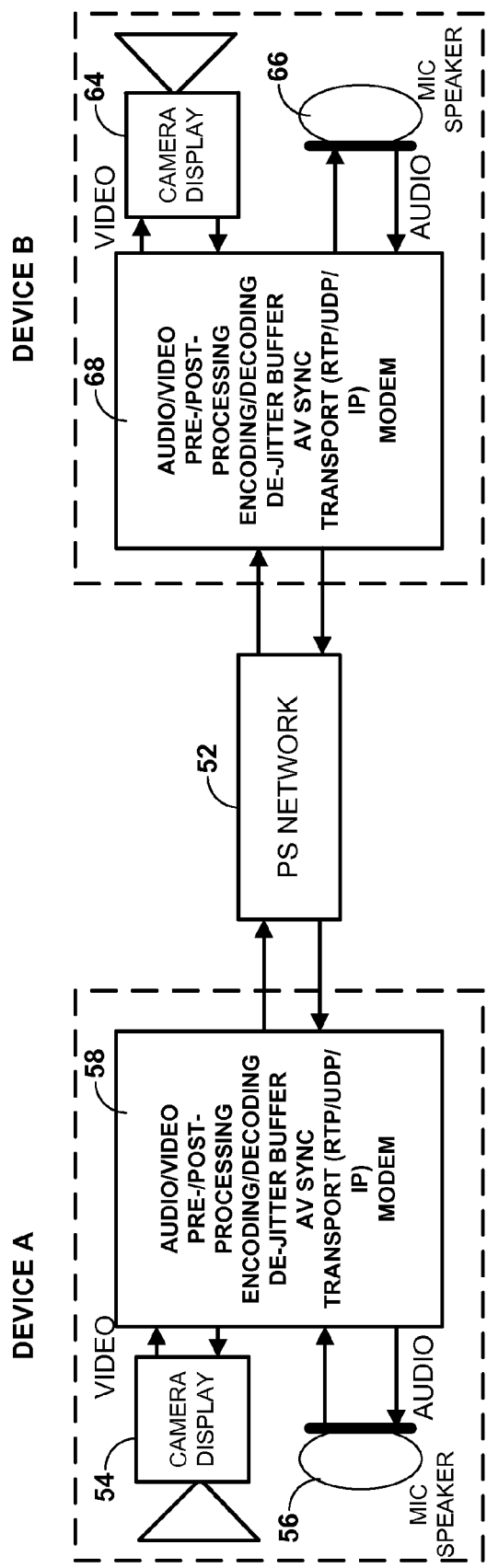
FIG. 2 depicts a simplified block diagram of a 2-way VT call over a generic packet-switched (PS) network

FIG. 2 depicts a simplified block diagram of a 2-way VT call over a generic packet-switched (PS) network 52. PS network 52 can be LTE, HSPA, (e)HRPD, WiFi, satellite, coax cable, power line communication, and the like, or a combination of any of the above. On the transmit side of Device A, the audio/video of the VT call are captured at mic/speaker 56 and camera/display 54, pre-processed, if applicable, encoded/compressed, RTP/UDP/IP packetized, and passed to the modem by processing unit 58. On the receive side of Device A, the received audio/video packets are demodulated, dis-packetized, de-jittered, decoded, AV synced and post-processed, if applicable, by processing unit 58 before sent to mic/speaker 56 and camera/display 54.

Likewise, on the transmit side of Device B, the audio/video of the VT call are captured at mic/speaker 66 and camera/display 64, pre-processed, if applicable, encoded/compressed, RTP/UDP/IP packetized, and passed to the modem by processing unit 68. On the receive side of Device B, the received audio/video packets are demodulated, dis-packetized, de-jittered, decoded, AV synced and post-processed, if applicable, by processing unit 68 before sent to mic/speaker 66 and camera/display 64.

Audio/video RTCP packets are also sent along with the audio/video RTP packets for AV sync, media performance related statistics, rate adaptation, and the like. RTCP packets occur less frequently than RTP packets. That is, the control information of the RTCP packets are typically signaled every 500 ms to every 2 seconds, while RTP packets occur more frequently.

During a typical two-party Video Telephony (VT) call, video may be paused one or more times in one or both directions as a result of a user action. For example, a user on either side might move a VT application to the background on the device to briefly perform some other tasks. For example, in the middle of a VT call, one of the users may use the phone camera to take a picture, quickly check email, or perform another task. As a result, the camera resource for the VT call may be released and, in which case, no video is sent over to the peer side. That is, when a user moves a VT application to the background, video is typically no longer sent to other party in the VT call. Video may be stopped because the user of the VT app in the background can no longer see a preview window that indicates what video is being transmitted. To provide for increased privacy, and to avoid sending video without notice, the VT app will typically cease sending video RTP packets. However, audio packets would continue and the VT is not dropped. The phenomenon, in which a video stream stops flowing in one or more directions, while the voice conversation continues, is typically called video pause.

Referring back to FIG. 2, VT systems benefit from techniques that allow Device A (or Device B) to indicate to Device B (or Device A) that it has paused the video. VT systems also benefit from techniques that allow a device to distinguish, when the incoming video is discontinued, whether the discontinued video is due to an intentional stop of video transmission (e.g., a video pause), or whether the discontinued video is a result of severe deterioration of the transmit path. Such techniques may be applicable to a one-way video (or video sharing (VS)) call, as well as a multi-party VT/VS call.

One existing solution to indicate a video pause is called a Call Hold procedure. That is, when Device A pauses the video, it puts the Device B video stream on hold, and vice versa, using explicit signaling. This approach can become complicated and/or ambiguous, especially when mixed with a user-initiated call downgrade (e.g., a user changing a VT call from a two-way video call to one-way video call), and/or user-initiated call upgrade (e.g., a user changing a VT call from one-way video call to two-way video call).

Figure 3:
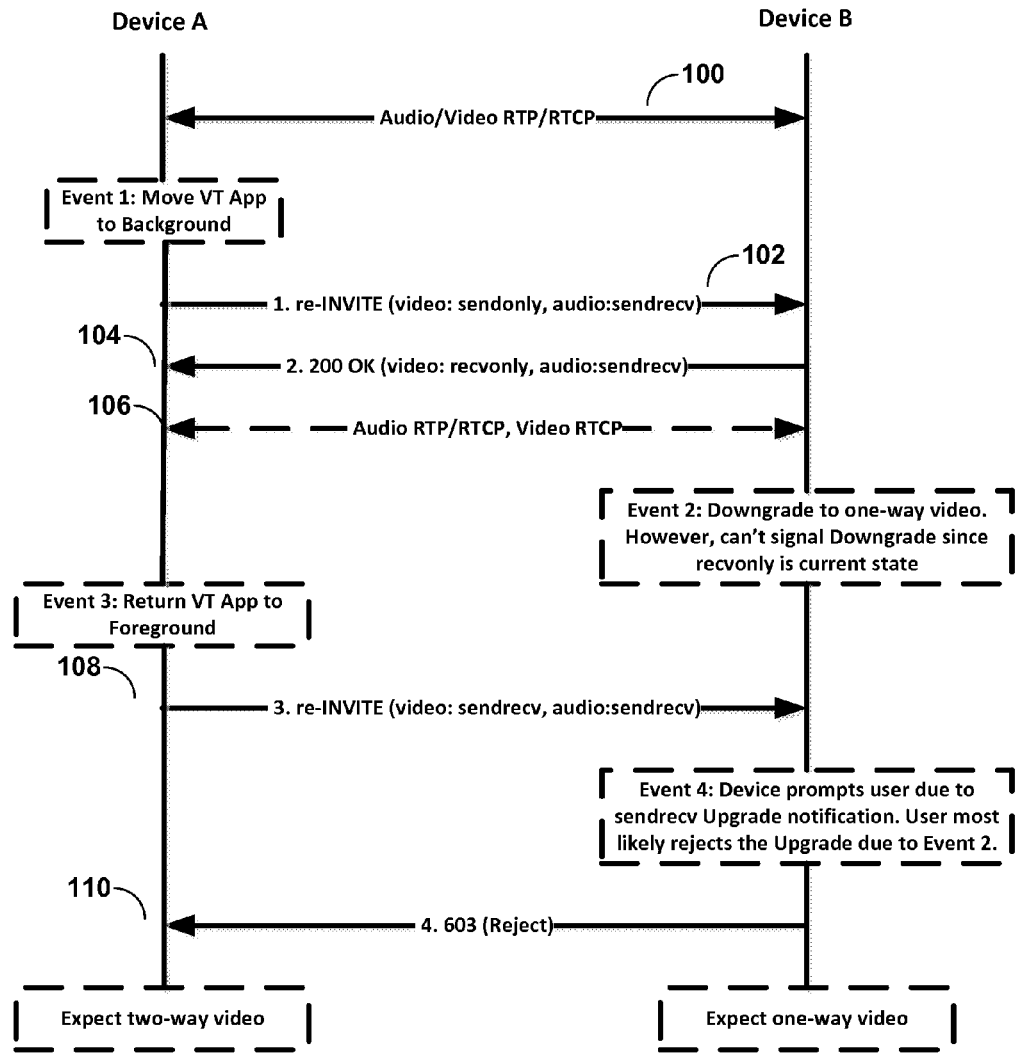
FIG. 3 is a conceptual diagram showing the signal flow for a use case of call downgrade during video pause using Call Hold explicit signaling

FIG. 3 is a conceptual diagram showing the signal flow for a use case of call downgrade during video pause using Call Hold explicit signaling. The call starts as a VT call. As time 100, Device A and Device B are in a VT call and are sending both audio and video RTP packets, as well as audio and video RTCP packets. At Event 1, the user of Device A user moves a VT application to the background. Event 1 causes a video pause. In conventional solutions, the video pause triggers explicit signaling to put Device B video on hold. The signaling shown in FIG. 3 is called session initiation protocol (SIP). At time 102, Device A sends a re-INVITE (video: sendonly, audio: sendrecv) SIP message to Device B. The re-INVITE message indicates that the device A will be operating as "sendonly" for video packets. That is, Device A is instructing Device B to cease sending video packets to Device A. At time 104, Device B responds with SIP message 200 OK (video: recvonly, audio: sendrecv), indicating the Device B has accepted the request and will be in "recnonly" mode (i.e., Device B will only receive video packets, and not send them). As such, at time 106, there is no video traffic except for RTCP from either device.

In the example of FIG. 3, at Event 2, the user of Device B initiates a downgrade to change the two-way video call to one-way video (Event 2). However, since Device B has accepted the request to be in "recvonly" mode, Device B is unable to send a SIP message (video: recvonly, audio: sendrecv) to indicate the downgrade, since it has already been in such a state as a result of Event 1. Next, in Event 3, the user of Device A moves the VT App to foreground. This event triggers Device A, at time 108, to send the SIP message re-INVITE (video:sendrecv, audio: sendrecv) to Device B to resume the two-way video from the point of view of Device A. However, since it appears as an 'upgrade' (from one-way video to two-way video) to Device B, Device B prompts the user to accept the upgrade. However, due to Event 2, the user of Device B would likely reject the 'upgrade' by sending SIP message 603 (reject) at time 110. In this case, Device A would be under the assumption that the VT call is a two-way video call, while Device B would be under the assumption that the VT call is a one-way video call. This example demonstrates the confusion/ambiguity in signaling and user expectation caused by using explicit SIP signaling, in particular signaling for a Call Hold procedure, to indicate video pause.

In view of these drawbacks, this disclosure proposes an alternative approach to indicate and determine a video pause. The approach of this disclosure does not employ any explicit signaling messages (e.g., SIP messages). Instead, this disclosure proposes to use the already available information carried in the incoming media itself. For example, this disclosure proposes to use information contained in RTP and/or RTCP packets (e.g., video RTP inactivity/activity, RTCP packet type, and/or statistics carried in video RTCP packets) as an indication of video pause. This approach provides for a real-time, simple, clean, and effective mechanism for determining a video pausing, without causing confusion in signaling and user experience/expectation.

Again, assume that Device A and Device B from FIG. 2 are in an active VT call, and Device A pauses the video (e.g., as a result of moving the VT App to the background). In this case, Device A stops sending video RTP packets to Device B. However, Device A continues to issue video RTCP packets. According to Internet Engineering Task Force (IETF) document RFC 3550, which specifies RTP and RTCP signaling protocols, when video is paused, the initial two RTCP packets, including the Sender Report (SR) (that is, "Payload Type"=200), are still signaled after the pause. The SR includes\information concerning the "sender's packet count" and the "sender's octet count" in the sender information section. The "senders packet count" is the number of RTP packets sent, while the "senders octet count" is the total amount of data sent in RTP packets. IETF RFC 3550 is available, as of Jul. 25, 2013, from http://www.ietf.org/rfc/rfc3550.txt, the entire content of which is incorporated by reference herein.

If Device A has paused the video and stopped sending RTP packets, the second RTCP packet of two consecutive RTCP packets should have the identical "senders' packet count" and "sender's octet count" to that contained in the first RTCP packet of the two consecutive RTCP packets. That is, if two consecutive RTCP packets have SR information that indicates that no data has been sent (i.e., sender's packet count and/or sender's octet count are identical), the receiving device (e.g., Device B) can be configured to determine that the cessation of video RTP packets is due to a video pause and not a degradation of the communication channel. However, if after RTP packets have ceased to be received, the SR in the two consecutive RTCP packets indicates that RTP packets were continued to be sent (e.g., the senders packet count and/or sender's octet count are not equal), the receiving device may be continued to configure that the channel for the VT call has degraded, and in some examples, the VT call should be ended. Also, if the video pause is long enough, subsequent RTCP packets after the SR RTCP packets issued by Device A should be Receiver Report (RR) (i.e., "Payload Type"=201) RTCP packets.

As such, when reception of video RTP packets is discontinued while video RTCP packets keep arriving, Device B can determine that Device A paused the video (rather than determining that the transmit path from Device A to Device B became degraded and, in which case, both video RTP and RTCP should be lost). Device B can further confirm this conclusion by inspecting the "Payload Type" information (SR vs. RR), and/or the "sender's packet count" and the "sender's octet count" fields if the received RTCP packet is an SR. Once Device B has confirmed that Device A has stopped sending video RTP packets due to a video pause, Device B can continue sending video to Device A (in this case, Device A can simply drop the video RTP packets, or reassemble and decode each frame, but not render them), put its own side VT application to the background (i.e., video pause) to carry out some other tasks, or even downgrade VT call to one-way video, etc., while still maintaining an audio connection with Device A. If Device B moves its own side VT app into background or downgrades the VT call to a one-way video, Device B will stop sending video RTP packets while continuing to send video RTCP packets to Device A. The RTCP packets from Device B may be used in the same way by Device A to determine a video pause by Device B. When both ends stop sending video RTP packets to each other, the RTCP packet sent from each side will eventually be empty RR.

In another example of the disclosure, the presence, or lack thereof, of RTP packets, in conjunction with continued receipt of RTCP packets, can be used to determine that a device in VT call has initiated a video call. For example, in some situations where the VT call uses a long delay (e.g., 2 seconds or more) between RTCP packets, waiting for two consecutive RTCP packets to determine if video has paused may be undesirable. As such, this disclosure further proposes to use the continued non-reception of RTP packets as an additional trigger to determine that a video pause has occurred.

As one example, Device B stops receiving video RTP packets from Device A, and then subsequently receives one RTCP packet. After the RTCP packet is received, Device B may start a timer. If no RTP packets are received before the timer reaches some predetermined threshold, Device B may proactively determine that Device A has paused the video. The threshold may be set to any value less than the interval between RTCP packets. Device B may then confirm the determination of a video pause at the time the second consecutive RTCP packet is received. In this way, a determination of video pause may be made more quickly in situations where there is a long delay between RTCP packets.

In summary, using the techniques of this disclosure, when one device pauses video in a VT call, the peer side can reliably, and in real-time detect such an event by checking the incoming video RTP inactivity, RTCP packet type and/or statistics carried in video RTCP packets. When the video RTP packets resume, the peer side can determine that the video pause is ended. In some examples, the device can present to the user video pause start and video pause end indications based on the above detections.

Figure 4:
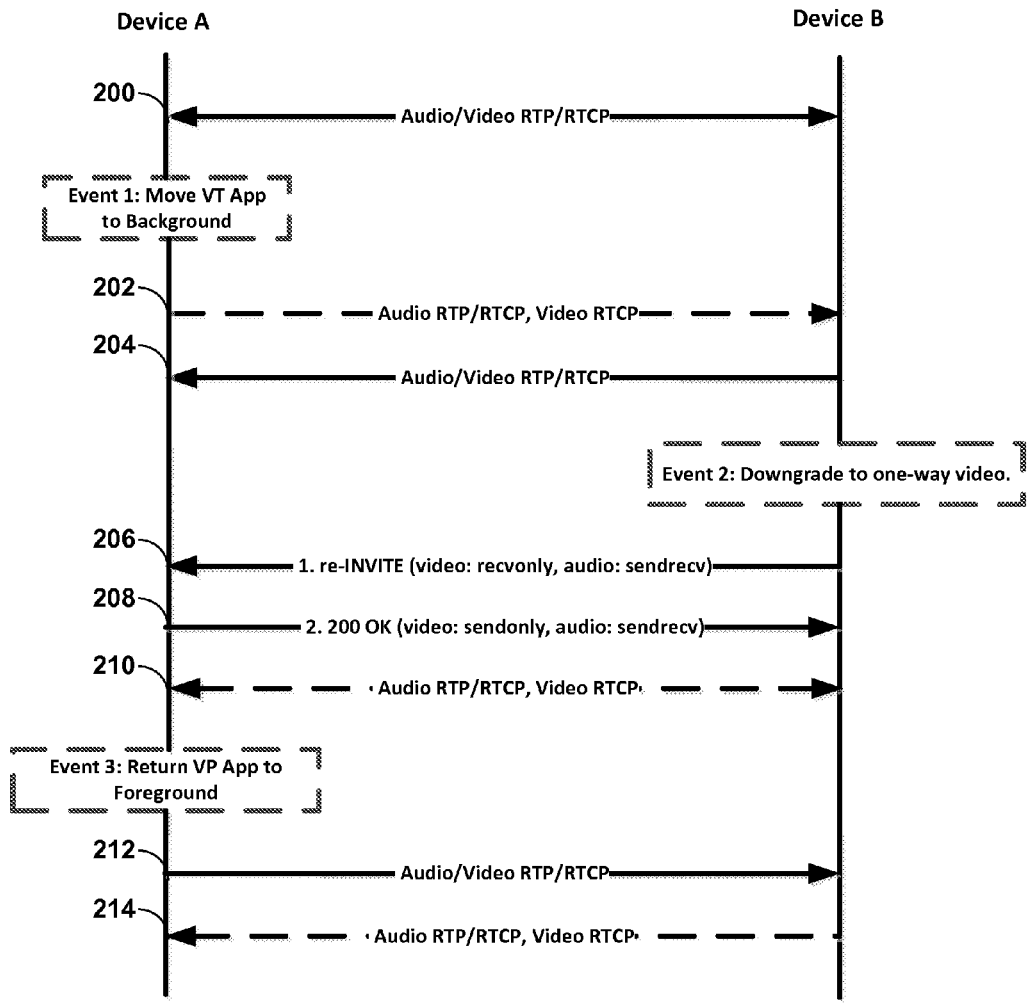
FIG. 4 is a conceptual diagram showing an example signal flow for one use case of video pause detection using the techniques of this disclosure.

When using the techniques of this disclosure, some of the specific call/media flows may vary, depending on the action of Device B (i.e., the device that has not paused) and/or the order of the events after Device A pauses the video. FIG. 4 is a conceptual diagram showing an example signal flow for one use case of video pause detection using the techniques of this disclosure. At time 200, Device A and Device B are in two-way VT call, where both audio and video RTP packets, along with audio and video RTCP packets are sent. At Event 1, Device A places a VT application in the background, thus pausing the video and ceasing the transmission of video RTP packets. As such, at time 202, no video RTP packets are sent to Device B. Video RTCP packets are continued to be sent to Device B. Based on the techniques of this disclosure described above, Device B determines that a video pause has occurred based on the information in the video RTCP packets (e.g., the SR). In the example of FIG. 4, at time 204, after Device B has detected a video pause by Device A, Device B decides to continue to send video RTP packets.

At Event 2, the user of Device B performs a downgrade operation to place the VT call in one-way mode. In response to the downgrade operation, re-INVITE, and 200 OK SIP message are exchanged at times 206 and 208 to put the VT call in one-way mode. As such, at time 210, no video RTP messages are sent from either device. Audio RTP/RTCP messages and video RTCP message are continued to be sent.

At Event 3, the user of Device A returns the VT application to the foreground. As such, at time 212, video RTP packets are again transmitted to Device B. At time 214, Device B continues to only transmit audio RTP packets, due to the user downgrade at Event 2. However, since the video pause was detected through RTCP packets, and not explicit SIP signaling, both devices correctly determine that a one-way video call is still in effect.

Figure 5:
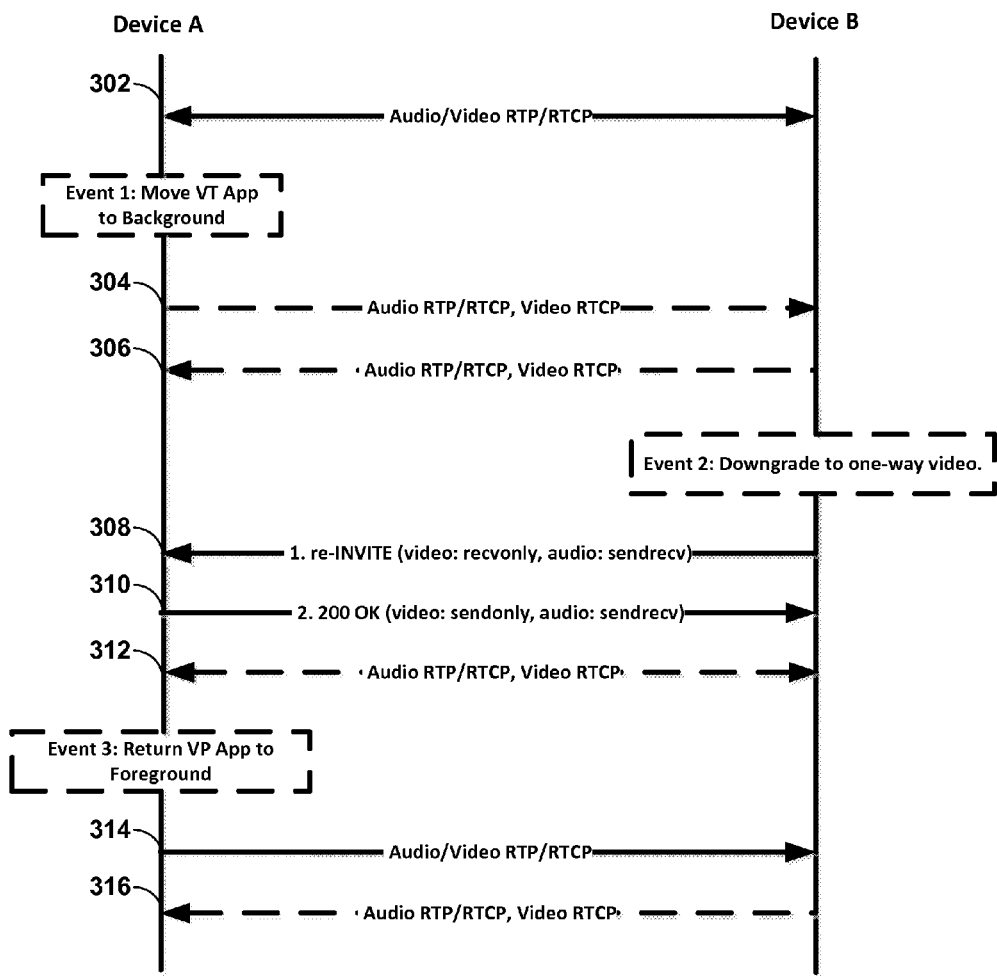
FIG. 5 is a conceptual diagram showing another example signal flow for another use case of video pause detection using the techniques of this disclosure.

FIG. 5 is a conceptual diagram showing another example signal flow for another use case of video pause detection using the techniques of this disclosure. At time 302, Device A and Device B are in two-way VT call, where both audio and video RTP packets, along with audio and video RTCP packets are sent. At Event 1, Device A places a VT application in the background, thus pausing the video and ceasing the transmission of video RTP packets. As such, at time 304, no video RTP packets are sent to Device B. Video RTCP packets are continued to be sent to Device B. Based on the techniques of this disclosure described above, Device B determines that a video pause has occurred based on the information in the video RTCP packets (e.g., the SR). In the example of FIG. 5, at time 306, after Device B has detected a video pause by Device A, Device B decides to cease to sending video RTP packets to Device A.

At Event 2, the user of Device B performs a downgrade operation to place the VT call in one-way mode. In response to the downgrade operation, re-INVITE, and 200 OK SIP message are exchanged at times 308 and 310 to put the VT call in one-way mode. As such, at time 312, no video RTP messages are sent from either device. Audio RTP/RTCP messages and video RTCP message are continued to be sent.

At Event 3, Device A returns the VT application to the foreground, e.g., in response to user input. As such, at time 314, video RTP packets are again transmitted to Device B. At time 316, Device B continues to only transmit audio RTP packets, due to the user downgrade at Event 2. However, since the video pause was detected through RTCP packets, and not explicit SIP signaling, both devices correctly determine that a one-way video call is still in effect. Compared to the call/media flows in FIG. 3, the state of each device in FIG. 4 and FIG. 5 is deterministic at each step, and there is no confusion from a user expectation point of view.

Figure 6:
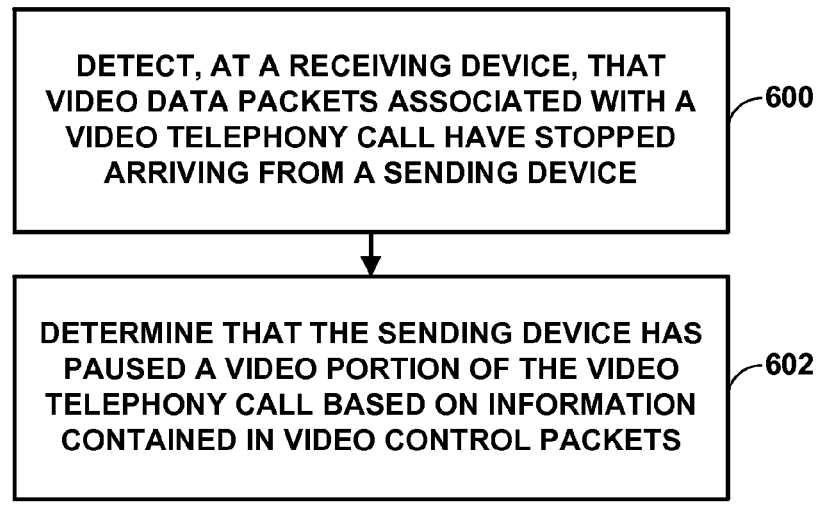
FIG. 6 is a flowchart showing an example method according to the techniques of this disclosure.

FIG. 6 is a flowchart showing an example method according to the techniques of this disclosure. The techniques of FIG. 6 may be carried out by one or more structural units or processors of Device A or Device B of FIG. 2. 1.

According to the example of FIG. 6, a receiving device (e.g., Device B) in a video telephony call may be configured to detect, at the receiving device, that video data packets associated with a video telephony call have stopped arriving from a sending device (600). The receiving device may be further configured to determine that the sending device has paused a video portion of the video telephony call based on information contained in video control packets (602).

In one example of the disclosure, the video control packets continue to be received at the receiving device after the video data packets have stopped arriving. In some examples, the video data packets are real-time transport protocol (RTP) packets, and the video control packets are RTP control protocol (RTCP) packets. In some examples, the information in the RTCP packets used to determine whether the sending device has paused a video portion of the video telephony call is one or more of a packet count and a total data amount. In some examples consistent with RTCP, the packet count is a sender's packet count in a sender report (SR) of the RTCP packet, and wherein the total data amount is a sender's octet count in the SR of the RTCP packet.

In another example of the disclosure, determining that the sending device has paused the video portion of the video telephony call comprises comparing one or more of the packet count and the total data amount in two consecutive RTCP packets to determine if the video has been paused, wherein a determination that the video has been paused is made if one or more of the packet count and the total data amount are the same for the two consecutive RTCP packets.

In another example of the disclosure, determining that the sending device has paused the video portion of the video telephony call comprises starting a timer after a video control packet has been received, and determining that the sending device has paused the video portion of the video telephony call if no video data packets are received within a threshold time from the start of the timer. In some examples, the threshold time is less than a time between two consecutive video control packets.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for video telephony, the method comprising:
detecting, at a receiving device, that video data packets associated with a video telephony call have stopped arriving from a sending device; and
determining, at the receiving device, that the sending device has paused a video portion of the video telephony call based on information contained in video control packets, wherein the information in the video control packets used to determine whether the sending device has paused a video portion of the video telephony call includes one or more of a packet count or a total data amount, and wherein determining, at the receiving device, that the sending device has paused the video portion of the video telephony call comprises: comparing one or more of the packet count or the total data amount in two consecutive video control packets to determine if the video has been paused, wherein a determination that the video has been paused is made if one or more of the packet count or the total data amount are the same for the two consecutive video control packets.

2. The method of claim 1, wherein the video control packets continue to be received at the receiving device after the video data packets have stopped arriving.

3. The method of claim 1, wherein the video data packets are real-time transport protocol (RTP) packets, and wherein the video control packets are RTP control protocol (RTCP) packets.

4. The method of claim 3, wherein the packet count is a sender's packet count in a sender report (SR) of the RTCP packet, and wherein the total data amount is a sender's octet count in the SR of the RTCP packet.

5. A method for video telephony, the method comprising:
detecting, at a receiving device, that video data packets associated with a video telephony call have stopped arriving from a sending device;
starting a timer after a video control packet has been received; and
determining that the sending device has paused the video portion of the video telephony call if no video data packets are received within a threshold time from the start of the timer.

6. The method of claim 5, wherein the threshold time is less than a time between two consecutive video control packets.

7. An apparatus configured for video telephony, the apparatus comprising:

means for detecting, at a receiving device, that video data packets associated with a video telephony call have stopped arriving from a sending device;
means for determining, at the receiving device, that the sending device has paused a video portion of the video telephony call based on information contained in video control packets, wherein the information in the video control packets used to determine whether the sending device has paused a video portion of the video telephony call includes one or more of a packet count or a total data amount, and wherein the means for determining, at the receiving device, that the sending device has paused the video portion of the video telephony call comprises:
means for comparing one or more of the packet count or the total data amount in two consecutive video control packets to determine if the video has been paused, wherein a determination that the video has been paused is made if one or more of the packet count or the total data amount are the same for the two consecutive video control packets.

8. The apparatus of claim 7, wherein the video control packets continue to be received at the receiving device after the video data packets have stopped arriving.

9. The apparatus of claim 7, wherein the video data packets are real-time transport protocol (RTP) packets, and wherein the video control packets are RTP control protocol (RTCP) packets.

10. The apparatus of claim 9, wherein the packet count is a sender's packet count in a sender report (SR) of the RTCP packet, and wherein the total data amount is a sender's octet count in the SR of the RTCP packet.

11. An apparatus configured for video telephony, the apparatus comprising:
means for detecting, at a receiving device, that video data packets associated with a video telephony call have stopped arriving from a sending device;
means for starting a timer after a video control packet has been received; and
means for determining that the sending device has paused the video portion of the video telephony call if no video data packets are received within a threshold time from the start of the timer.

12. The apparatus of claim 11, wherein the threshold time is less than a time between two consecutive video control packets.

13. An apparatus configured for video telephony, the apparatus comprising:
a receiving device configured to:
detect, at the receiving device, that video data packets associated with a video telephony call have stopped arriving from a sending device; and
determine that the sending device has paused a video portion of the video telephony call based on information contained in video control packets, wherein the information in the video control packets used to determine whether the sending device has paused a video portion of the video telephony call includes one or more of a packet count or a total data amount, and wherein determining, at the receiving device, that the sending device has paused the video portion of the video telephony call comprises:
comparing one or more of the packet count or the total data amount in two consecutive video control packets to determine if the video has been paused, wherein a determination that the video has been paused is made if one or more of the packet count or the total data amount are the same for the two consecutive video control packets.

14. The apparatus of claim 13, wherein the video control packets continue to be received at the receiving device after the video data packets have stopped arriving.

15. The apparatus of claim 13, wherein the video data packets are real-time transport protocol (RTP) packets, and wherein the video control packets are RTP control protocol (RTCP) packets.

16. The apparatus of claim 15, wherein the packet count is a sender's packet count in a sender report (SR) of the RTCP packet, and wherein the total data amount is a sender's octet count in the SR of the RTCP packet.

17. An apparatus configured for video telephony, the apparatus comprising: a receiving device configured to:
   detect, at the receiving device, that video data packets associated with a video telephony call have stopped arriving from a sending device;
   start a timer after a video control packet has been received; and
   determine that the sending device has paused the video portion of the video telephony call if no video data packets are received within a threshold time from the start of the timer.

18. The apparatus of claim 17, wherein the threshold time is less than a time between two consecutive video control packets.

19. A non-transitory computer-readable storage medium storing instructions that, when executed, cause one or more processors of a device for video telephony to:
   detect, at the receiving device, that video data packets associated with a video telephony call have stopped arriving from a sending device;
   determine, at the receiving device, that the sending device has paused a video portion of the video telephony call based on information contained in video control packets, wherein the information in the video control packets used to determine whether the sending device has paused a video portion of the video telephony call includes one or more of a packet count or a total data amount, and wherein determining, at the receiving device, that the sending device has paused the video portion of the video telephony call comprises: comparing one or more of the packet count or the total data amount in two consecutive video control packets to determine if the video has been paused, wherein a determination that the video has been paused is made if one or more of the packet count or the total data amount are the same for the two consecutive video control packets.

20. The computer-readable storage medium of claim 19, wherein the video control packets continue to be received at the receiving device after the video data packets have stopped arriving.

21. The computer-readable storage medium of claim 19, wherein the video data packets are real-time transport protocol (RTP) packets, and wherein the video control packets are RTP control protocol (RTCP) packets.

22. The computer-readable storage medium of claim 21, wherein the packet count is a sender's packet count in a sender report (SR) of the RTCP packet, and wherein the total data amount is a sender's octet count in the SR of the RTCP packet.

* * * * *